United States Patent
Kiba et al.

(10) Patent No.: US 8,194,155 B2
(45) Date of Patent: Jun. 5, 2012

(54) INFORMATION PROCESSING APPARATUS, BUFFER CONTROL METHOD, AND COMPUTER PROGRAM

(75) Inventors: Hiroyuki Kiba, Tokyo (JP); Takashi Kameya, Kanagawa (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 12/592,987

(22) Filed: Dec. 7, 2009

(65) Prior Publication Data

US 2010/0149376 A1    Jun. 17, 2010

(30) Foreign Application Priority Data

Dec. 12, 2008   (JP) ................................ P2008-316975

(51) Int. Cl.
*H04N 5/76* (2006.01)

(52) U.S. Cl. ..................................................... 348/231.2

(58) Field of Classification Search ................. 348/231.2
See application file for complete search history.

(56) References Cited

U.S. PATENT DOCUMENTS

| | | | |
|---|---|---|---|
| 6,252,585 B1* | 6/2001 | Van Splunter et al. ....... | 345/589 |
| 6,356,314 B1* | 3/2002 | Takebe ........................... | 348/564 |
| 7,499,080 B2* | 3/2009 | Hattori et al. ............... | 348/220.1 |
| 2009/0132771 A1* | 5/2009 | Wang ........................... | 711/154 |

FOREIGN PATENT DOCUMENTS

| JP | 10-322571 A | 12/1998 |
|---|---|---|
| JP | 2002-135663 A | 5/2002 |
| JP | 2005020521 A | 1/2005 |

OTHER PUBLICATIONS

Office Action from Japanese Application No. 2008-316975, dated Oct. 19, 2010.

* cited by examiner

*Primary Examiner* — James Hannett

(74) *Attorney, Agent, or Firm* — Lerner, David, Littenberg, Krumholz & Mentlik, LLP

(57) ABSTRACT

An information processing apparatus is provided which includes a buffer for holding image data output line by line from an image pickup device, a write enable generator for generating a write enable signal which indicates a timing by which the image data is written to the buffer line by line, an adder for adding per reference clock a read frequency set value which determines readout frequency of the image data written in the buffer, and a write enable generator for generating a read enable signal which indicates a timing by which the image data written in the buffer is read out line by line based on an added value of the read frequency set values.

7 Claims, 10 Drawing Sheets

WITHOUT LINE BUFFER CONTROL

WITH LINE BUFFER CONTROL

INFORMATION PROCESSING APPARATUS, BUFFER CONTROL METHOD, AND COMPUTER PROGRAM

CROSS-REFERENCE TO RELATED APPLICATION

The present application claims priority from Japanese Patent Application No. JP 2008-316975 filed in the Japanese Patent Office on Dec. 12, 2008, the entire content of which is incorporated herein by reference.

BACKGROUND OF THE INVENTION

1. Field of the Invention

The present invention relates to an information processing apparatus, a buffer control method, and a computer program.

2. Description of the Related Art

An image pickup apparatus, such as a digital steel camera, generally uses a solid-state image pickup device such as a CCD (Charge Coupled Device) or a CMOS (Complementary Metal Oxide Semiconductor) imager as an image pickup device. In particular, the CMOS imager can read out data at high speed and is suited for realization of real-time processing which demands high-speed performance.

When image data is read into a camera system LSI from a front end and image processing is performed, the image data output from the front end is first output to a camera signal processor and is subjected to various camera signal processing. At this time, the same image data is also output from the front end to an image signal detector for performing processing on detected signals of the image photographed by the camera. The image data processed by the camera signal processor is output to a data bus by a memory controller and to an image memory via a memory interface (also referred to as "memory I/F" hereinafter) and is temporarily stored therein. The image data temporarily stored in the image memory is output from the image memory to the data bus via the memory I/F again by the memory controller. After that, the image data is input into a memory interface (also referred to as "monitor I/F" hereinafter) for display or to an image compressor/decompressor, and then subjected to a processing for outputting it to an external monitor and to a recording process, after a predetermined image processing is performed thereon.

When such flow of data is practiced, the data bus is shared by a plurality of image processing blocks, and hence it is necessary to pay attention to the usage of data bus bandwidth. In particular, when the image data is read out from the CMOS imager at high speed and temporarily stored in the image memory in order to realize real-time processing which demands high-speed performance, there is concern that the usage of data bus bandwidth may substantially increase instantaneously. Under such circumstances, other image processing blocks or a microcomputer cannot use the data bus, which therefore reduces processing efficiency. Moreover, instantaneous and substantial increase in the usage of data bus bandwidth leads to an increase in the peak value of power consumption within the LSI, and hence stable operation may not be ensured from the aspect of power supply.

In order to overcome such difficulties, there is disclosed in Japanese Unexamined Patent Application Publication No. 2002-135663 a means for inserting a FIFO data buffer in between an external input part and a data processor, receiving input data temporarily by the FIFO data buffer, and controlling output rate from the buffer. With such method, it is possible to compare the remaining amount of data in the FIFO data buffer with the amount of the input data, to determine increase or decrease of output data rate corresponding to this comparison result, and to transmit data in a phased manner, which is therefore effective for data rate control.

Moreover, there is disclosed in Japanese Unexamined Patent Application Publication No. H10-322571 a method for performing input image data processing necessary for camera signal processing by the common line buffer control with image processing, by sharing a line memory for the image processing and simultaneously performing mirror reverse processing of the input image data.

SUMMARY OF THE INVENTION

However, there was a difficulty that the method in Japanese Unexamined Patent Application Publication No. 2002-135663 demands the installation of a circuit such as a data rate determinator and a speed convertor and there should be realized algorithm development and an implementation method applicable for rate determination or speed conversion.

Then, in light of the foregoing, it is desirable to provide a novel and improved information processing apparatus, buffer control method, and computer program, capable of sending out the image data read out at high speed from a solid-state image pickup device without increasing the instantaneous usage of data bus bandwidth.

According to an embodiment of the present invention, there is provided an information processing apparatus including a buffer for holding image data output line by line from an image pickup device, a write enable generator for generating a write enable signal which indicates a timing by which the image data is written to the buffer line by line, an adder for adding per reference clock a read frequency set value which determines readout frequency of the image data written in the buffer, and a write enable generator for generating a read enable signal which indicates a timing by which the image data written in the buffer is read out line by line based on an added value of the read frequency set values.

According to the present invention, the image data written in the buffer line by line is read out based on the read enable signal generated based on the added value of the read frequency set values. In this way, usage of the data bus bandwidth in the readout processing of the image data can be easily controlled by using the added value of the read frequency set values. Because of this, the instantaneous usage of the data bus bandwidth can be reduced and available data bus bandwidth can be used by other image processing blocks or a microcomputer, thereby enabling increase in processing efficiency.

Here, when the added value of the read frequency set values exceeds a predetermined value, the read enable generator may generate the read enable signal. At this time, the adder subtracts the predetermined value from the added value.

Moreover, there may be further included a set value storage for storing the read frequency set value while correlating the read frequency set value with an imaging mode in which the image pickup device images the image. At this time, there may be further included a changer for changing the read frequency set value according to the imaging mode.

Furthermore, the higher the read frequency of the image data is, the larger the read frequency set value may be set.

Moreover, the read frequency set value may be set such that a reading rate of reading out the image data from the buffer is larger than a writing rate of writing the image data to the buffer.

The write enable generator may start to output the write enable signal based on an output of a vertical synchronization signal which gets active at the head of a frame of the image data. After that, the write enable generator may output the write enable signal based on a horizontal synchronization signal which gets active at the head of each line of the image data.

Moreover, according to another embodiment of the present invention, there is provided a buffer control method including the steps of generating a write enable signal which indicates a timing by which the image data output from an image pickup device line by line is written to a buffer, writing the image data to the buffer line by line based on an output of the write enable signal, adding per reference clock a read frequency set value which determines readout frequency of the image data written in the buffer, generating a read enable signal which indicates a timing by which the image data written in the buffer is read out based on an added value of the read frequency set values, and reading out the image data from the buffer line by line based on an output of the read enable signal.

Furthermore, according to another embodiment of the present invention, there is provided a computer program for causing a computer to function as the means of generating a write enable signal which indicates a timing by which the image data output from an image pickup device line by line is written to a buffer, writing the image data to the buffer line by line based on an output of the write enable signal, adding per reference clock a read frequency set value which determines readout frequency of the image data written in the buffer, generating a read enable signal which indicates a timing by which the image data written in the buffer is read out based on an added value of the read frequency set values, and reading out the image data from the buffer line by line based on an output of the read enable signal.

According to the embodiments of the present invention described above, there can be provided an information processing apparatus, a buffer control method, and a computer program, capable of sending out the image data read out at high speed from a solid-state image pickup device without increasing the instantaneous usage of data bus bandwidth.

DETAILED DESCRIPTION OF THE EMBODIMENT

Figure 1:
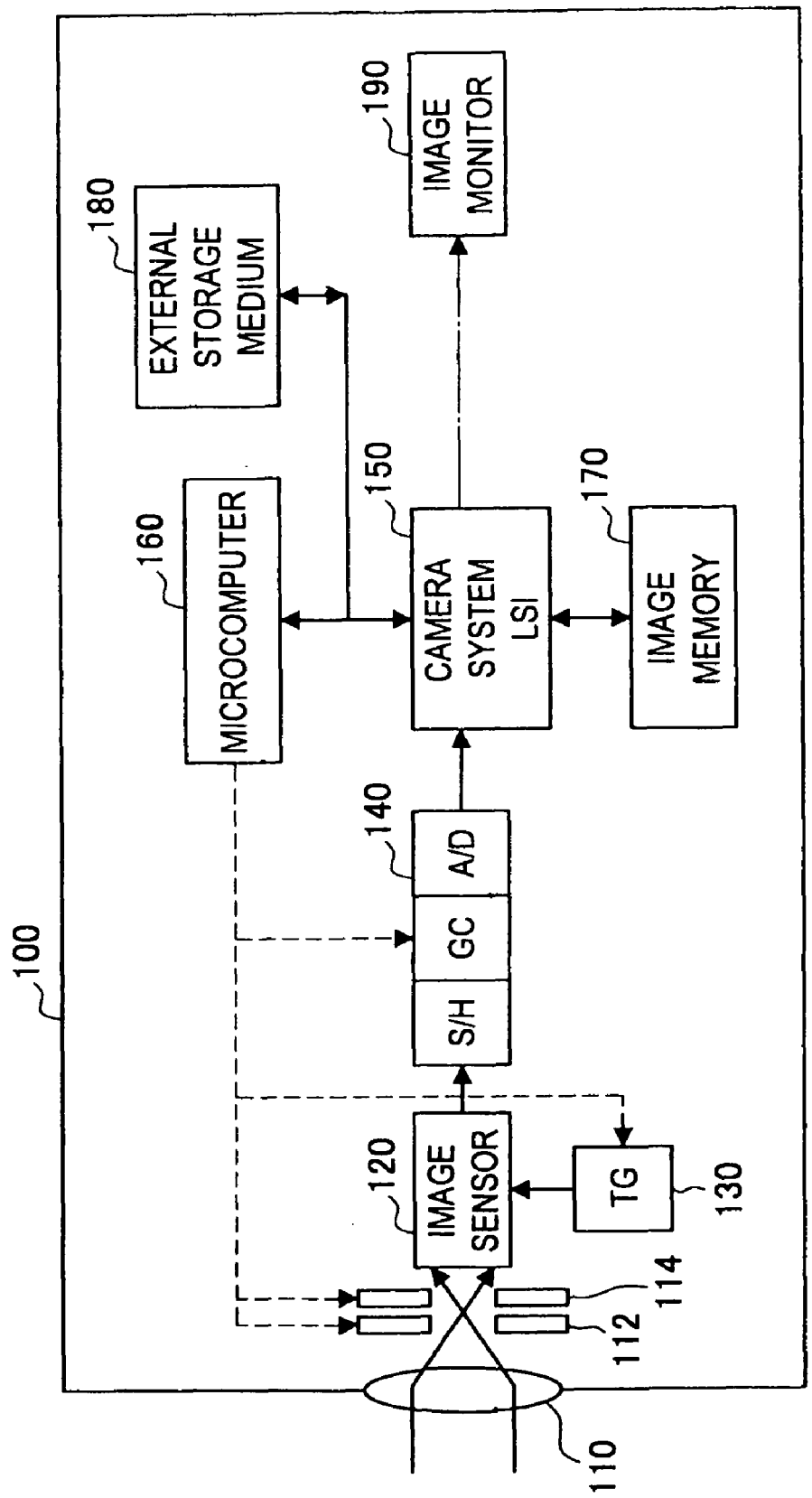
FIG. 1 is a block diagram showing a schematic configuration of a digital steel camera according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Schematic Configuration of Digital Steel Camera>

Figure 2:
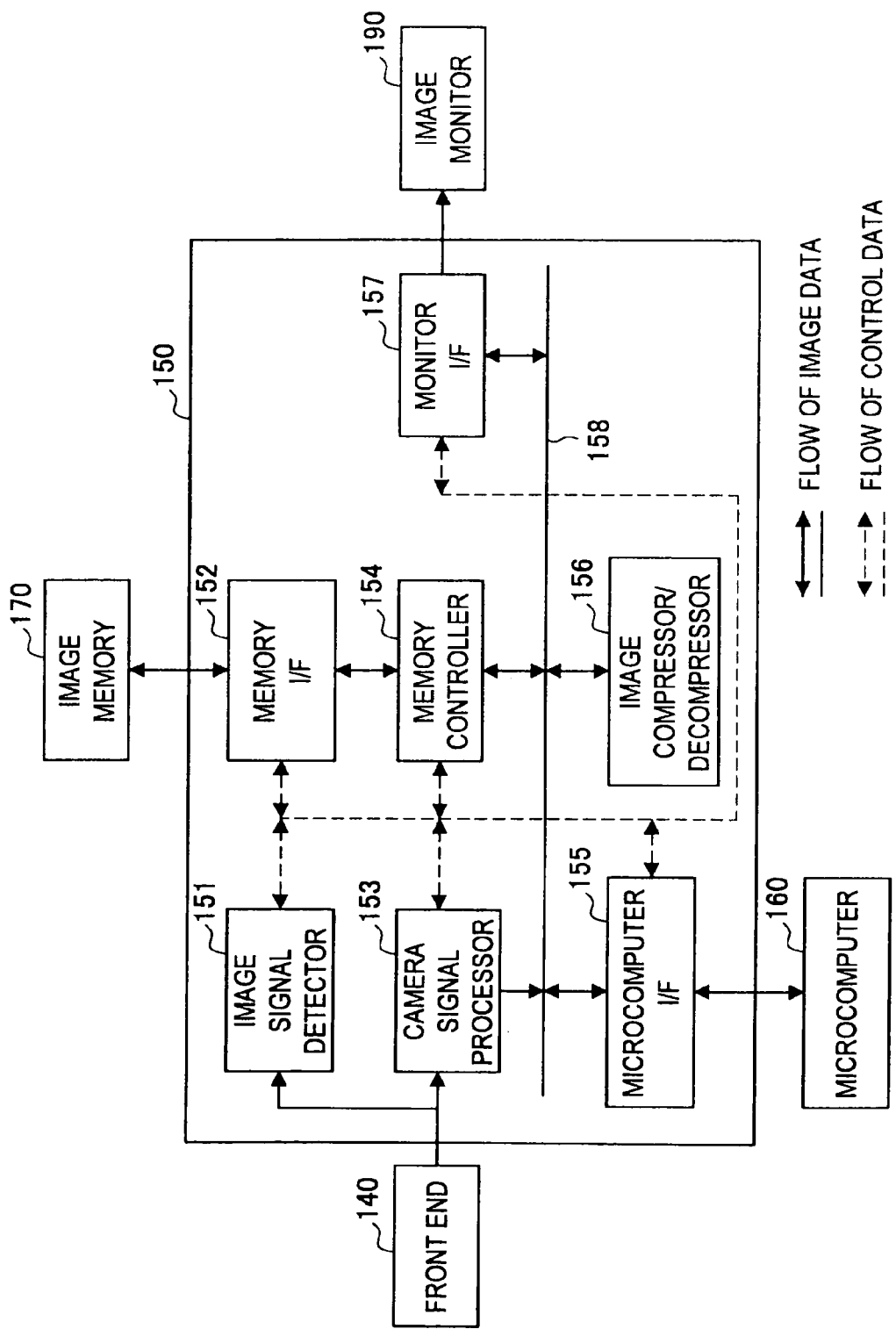
FIG. 2 is a block diagram showing a configuration of a camera system LSI according to the embodiment.

First, there will be described based on FIG. 1 and FIG. 2 a schematic configuration of a digital steel camera 100 which is one example of an apparatus including an information processing apparatus according to an embodiment of the present invention. In addition, FIG. 1 is a block diagram showing the schematic configuration of the digital steel camera 100 according to the present embodiment. FIG. 2 is a block diagram showing a configuration of a camera system LSI 150 according to the present embodiment.

The digital steel camera 100 according to the present embodiment includes a lens 110, an image sensor 120, and a timing generator (Timing Generator; TG) 130, as shown in FIG. 1. Furthermore, the digital steel camera 100 includes a front end 140, the camera system LSI 150, a microcomputer 160, an image memory 170, an external storage medium 180, and an image monitor 190.

The lens 110 is an optical element which condenses light from a photographic subject and leads it to the image sensor 120. A diaphragm 112 and a shutter 114 are provided between the lens 110 and the imager sensor 120. The diaphragm 112 controls the amount of light condensed into the image sensor 120 by changing the area through which light passes. The shutter 114 controls exposure by blocking the passage of light. In addition, although the diaphragm 112 and the shutter 114 are separately provided in FIG. 1, a diaphragm 112 which also has a function of the shutter 114 may be provided.

The image sensor 120 is a sensor such as a CCD or CMOS sensor, and is an element which converts light information of the photographic subject into electrical signals. A plurality of color filters (not shown) are arranged on the surface of the image sensor 120 in order to distinguish colors. The image sensor 120 transmits the converted electrical signals to the front end 140 described later.

The timing generator (TG) 130 drives the image sensor 120 in a horizontal direction and in a vertical direction. Moreover, the TG 130 controls exposure using, for example, a high-speed/low-speed electronic shutter.

The front end 140 converts analog signals input from the image sensor 120 into digital signals. The front end 140 performs correlated double sampling for removing noise, gain control, and A/D conversion, as shown in FIG. 1. The front end 140 transmits the generated digital signals to the camera system LSI 150 described later.

The camera system LSI 150 performs various digital signal processing based on the digitized information from the image sensor 120 and generates a brightness signal and color signals. The camera system LSI 150 can also generate compressed data by compressing the data. The camera system LSI 150 includes an image signal detector 151, a memory interface 152, and a camera signal processor 153, as shown in FIG. 2. Furthermore, the camera system LSI 150 includes a memory controller 154, a microcomputer interface 155, an image compressor/decompressor 156, and a monitor interface 157.

The image signal detector 151 performs processing on detected signals of the image photographed by the camera that becomes the basis of various camera controls such as auto focus (AF), auto exposure (AE), and auto white balance (AWB). The memory interface 152 functions as an interface with the image memory 170 used for the signal processing in the camera system LSI 150 and transmits and receives the image data and the compressed data.

Based on the image information from the sensor digitized at the front end 140, the camera signal processor 153 performs the digital signal processing and generates image signals consisting of a brightness signal and color signals. The camera signal processor 153 performs the digital signal processing such as interpolation calculation, filter calculation, matrix calculation, brightness generation calculation, and color generation calculation. The memory controller 154 transmits and receives the image data between each of the signal processing blocks or between the signal processing block and the memory, and controls a data bus where the data flow.

The microcomputer interface 155 functions as a bus interface with the micro computer 160 which controls the camera system LSI 150, and transmits and receives control data and the image data between the microcomputer 160 and the camera system LSI 150. The image compressor/decompressor 156 generates compressed data by compressing the data and decompresses the compressed data as well. A JPEG encoder and the like can be used as the image compressor/decompressor 156, for example. The monitor interface 157 converts the image data into various display formats for displaying it on the external monitor 190. A NTSC encoder and the like can be used as the monitor interface 157, for example.

Returning to FIG. 1, the microcomputer 160 is a microcomputer, which controls the entire camera block. The microcomputer 160 performs, for example, exposure control by the diaphragm 112, opening and closing control of the shutter 114, electronic shutter control in the TG 130, gain control in the front end 140, various mode controls by the camera system LSI 150, and parameter control.

The image memory 170 is a memory element for storing the digital image data, and is, for example, a SDRAM (Synchronous DRAM). The image memory 170 is used for the digital signal processing in the camera system LSI 150.

The external storage medium 180 is a storage medium which stores the compressed data (e.g., JPEG and the like). The storage medium 180 is usually provided movable relative to the body of the digital steel camera 100. The image data processed in the camera system LSI 150 is recorded in the external storage medium 180.

The image monitor 190 is a display for monitoring the photographed image, and is, for example, a LCD (Liquid Crystal Display) panel. The image data processed in the camera system LSI 150 is displayed on the image monitor 190.

In such digital steel camera 100, the image data is read into the camera system LSI 150 from the front end 140 and the image processing is performed thereon. The image data output from the front end 140 is output to the camera signal processor 153 and subjected to various camera signal processing. At this time, the same image data is also output to the image signal detector 151 from the front end 140 for performing processing on detected signals of the image photographed by the camera. The image data processed by the camera signal processor 153 is output to a data bus 158 by the memory controller 154 and to the image memory 170 via the memory interface 152 to be temporarily stored therein.

The image data temporarily stored in the image memory 170 is output to the data bus 158 from the image memory 170 via the memory interface 152 again by the memory controller 154. After that, the image data is input into the image compressor/decompressor 156 and subjected to a recording process. Moreover, the image data is output to the image monitor 190 after being input into the monitor interface 157 and subjected to a predetermined image processing.

Figure 3:
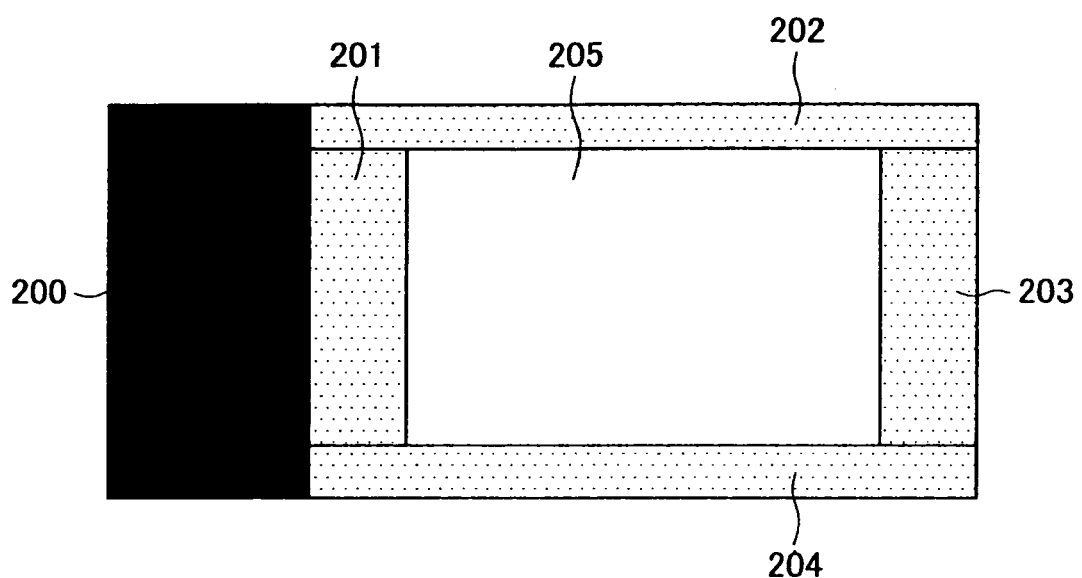
FIG. 3 is an explanatory diagram showing an example of a two dimensional pixel image of image data output by a CMOS imager.
Figure 4:
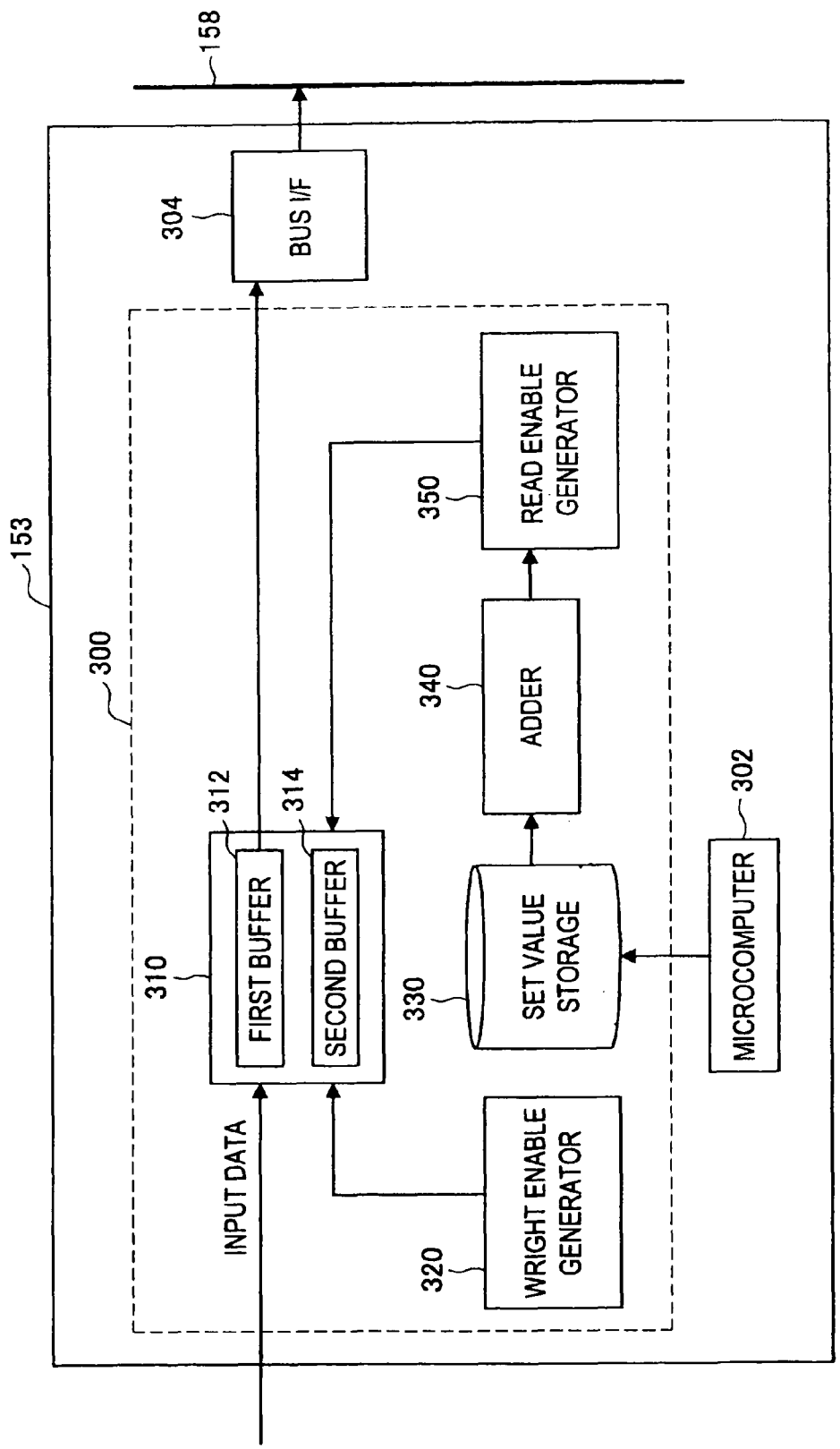
FIG. 4 is a block diagram showing a configuration of a data rate controller according to the embodiment.

The schematic configuration of the digital steel camera 100 according to the present embodiment has been described above. Next, a configuration of a data rate controller 300 according to the present embodiment will be described based on FIG. 3 and FIG. 4. In addition, FIG. 3 is an explanatory diagram showing an example of a two dimensional pixel image of the image data output by a CMOS imager. FIG. 4 is a block diagram showing the configuration of the data rate controller 300 according to the present embodiment.

<Configuration of Data Rate Controller>

The two dimensional pixel image of the image data output by the CMOS imager will be described based on FIG. 3 before describing the configuration of the data rate controller 300 according to the present embodiment. The image data output by the CMOS imager consists of an optical black (OPB) region 200 for black detection, a valid region 205, and an irrelevant region, as shown in FIG. 3. The irrelevant region consists of a left irrelevant region 201, an upper irrelevant region 202, a right irrelevant region 203, and a lower irrelevant region 204 which surround the valid region 205. The irrelevant region is normally an area surrounding the valid region 205 which is a recording region, with a couple of pixels widths, but a margin is given to the irrelevant region in the present embodiment. The CMOS imager of the digital steel camera 100 according to the present embodiment scans from the left top of the OPB region 200 to the right direction and outputs the image data line by line down to the lower irrelevant region 204, which is the final line.

Next, the configuration of the data rate controller 300 according to the present embodiment will be described based on FIG. 4. The date rate controller 300 is an information proceeding apparatus performs line buffer control. The data rate controller 300 includes a line buffer 310, a write enable generator 320, a set value storage 330, an adder 340, and a read enable generator 350, as shown in FIG. 4.

The line buffer 310 is a buffer which temporarily stores the image data per line. The line buffer 310 according to the present embodiment consists of two buffers (a first buffer 312 and a second buffer 314) so as to hold the image data of two lines. Based on a write enable signal output from the write enable generator 320, the line buffer 310 stores the image data to be temporarily stored. Moreover, the line buffer 310 outputs the image data to a BUS I/F 304 based on a read enable signal output from the read enable generator 350.

The write enable generator 320 is a function part which generates a write enable signal and outputs the write enable signal to the line buffer 310. The write enable signal indicates a timing by which the image data input from the front end 140 is written to the line buffer 310.

The set value storage 330 stores a read frequency set value which determines frequency of reading out the image data from the line buffer 310. The read frequency set value is obtained by mapping a control register by the microcomputer 302. The read frequency set value is set to a value from 0 to 1, for example. Moreover, the set value storage 330 can also store the read frequency set value while correlating it with each imaging mode of the digital steel camera 100.

The adder 340 obtains a read frequency set value by referring to the set value storage 330 and performs processing of adding the read frequency set value per clock cycle. The adder 340 outputs the added value of the read frequency set values to the read enable generator 350.

The read enable generator 350 is a function part which generates a read enable signal and outputs the read enable signal to the line buffer 310. The read enable generator 350 judges whether carry occurs on the added value of the read frequency set values input from the adder 340, and when it occurs, the read enable generator 350 outputs the read enable signal to the line buffer 310. For example, when the read frequency set value is set to a value between 0 to 1, the read enable generator 350 judges whether the added value is 1 or more, and when the added value becomes 1 or more, the read enable generator 350 outputs the read enable signal to the line buffer 310.

Figure 5:
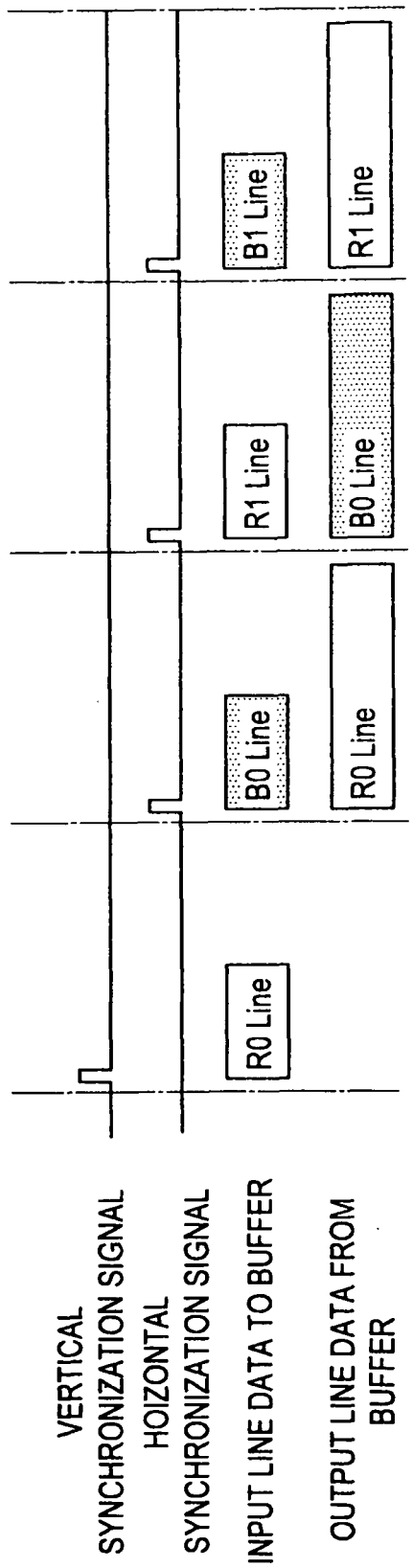
FIG. 5 is an explanatory diagram for explaining timing of writing and reading out of the image data to a line buffer according to the embodiment.
Figure 6:
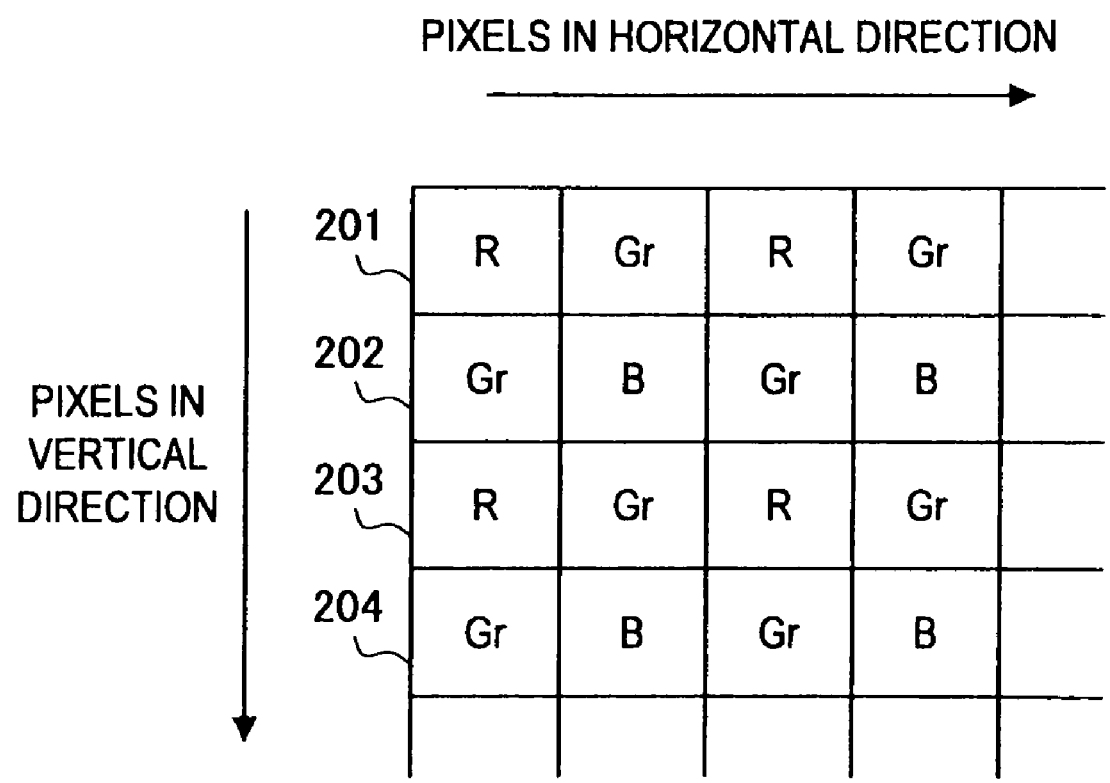
FIG. 6 is an explanatory diagram showing a configuration of the image data.

The configuration of the data rate controller 300 according to the present embodiment has been described above. Next, line buffer control by the data rate controller 300 will be described based on FIG. 5 to FIG. 9. First, timing of writing and reading out of the image data to the line buffer 310 according to the present embodiment will be described, based on FIG. 5 and FIG. 6. In addition, FIG. 5 is an explanatory diagram for explaining timing of writing and reading out of the image data to the line buffer 310 according to the present embodiment. FIG. 6 is an explanatory diagram showing a configuration of the image data.

The write processing of the image data to the line buffer 310 begins with the output of a vertical synchronization signal as shown in FIG. 5. The vertical synchronization signal gets active at the head of a frame. The valid region 205 of the image data in FIG. 3 consists of, as shown in FIG. 6, a R-Gr line in which a red pixel (R) and a green pixel (Gr) are alternately arranged in a horizontal direction, and a Gr-B line (reference numerals 202 and 204) in which a green pixel (Gr) and a blue pixel (B) are alternately arranged in a horizontal direction. The R-Gr line (reference numerals 201 and 203) and the Gr-B line are alternately arranged in a vertical direction. As described above, the CMOS imager scans from the left to of the OPB region 200 to the right direction and outputs the image data line by line down to the lower irrelevant region 204, which is the final line. Accordingly, when the vertical synchronization signal is output, the R-Gr line 201 is first input into the line buffer 310, for example, the first line buffer 312 of the line buffer 310, as shown in FIG. 5.

When the first one of the lines constituting the image data is started to be output based on the output of the vertical synchronization signal, the vertically arranged Gr-B lines and R-Gr lines are input into the line buffer 310 based on an output of a horizontal synchronization signal. The horizontal synchronization signal gets active at the head of the line. The data of the each line input from the CMOS imager are alternately input into the first buffer 312 and the second buffer 314. The input of the image data into the line buffer 310 is rapidly performed at the data rate of the image pickup device such as the CMOS imager.

On the other hand, the image data input into the line buffer 310 is output to an image expanding circuit 360 based on an output of a read enable signal described later. The line data stored in the two buffers of the line buffer 310 is alternately output to the image expanding circuit 360, like from the first buffer 312, the second buffer 314, the first buffer 312 and so on. In the example in FIG. 5, the line data is output from the line buffer 310 at the timing when the horizontal synchronization signal gets active.

The data rate controller 300 according to the present embodiment adjusts the output of the line data in order to prevent the line data rapidly written in the line buffer 310 from being rapidly output to the data bus 158. In the example in FIG. 5, since the write processing of the line data to the line buffer 310 is performed at high speed, the line data is written to the line buffer 310 in a short usage of time. On the other hand, in the readout processing of the line data from the line buffer 310, the data is output little by little using output cycle of the horizontal synchronization signal in order to prevent the data from being rapidly output to the data bus 158.

Figure 7:
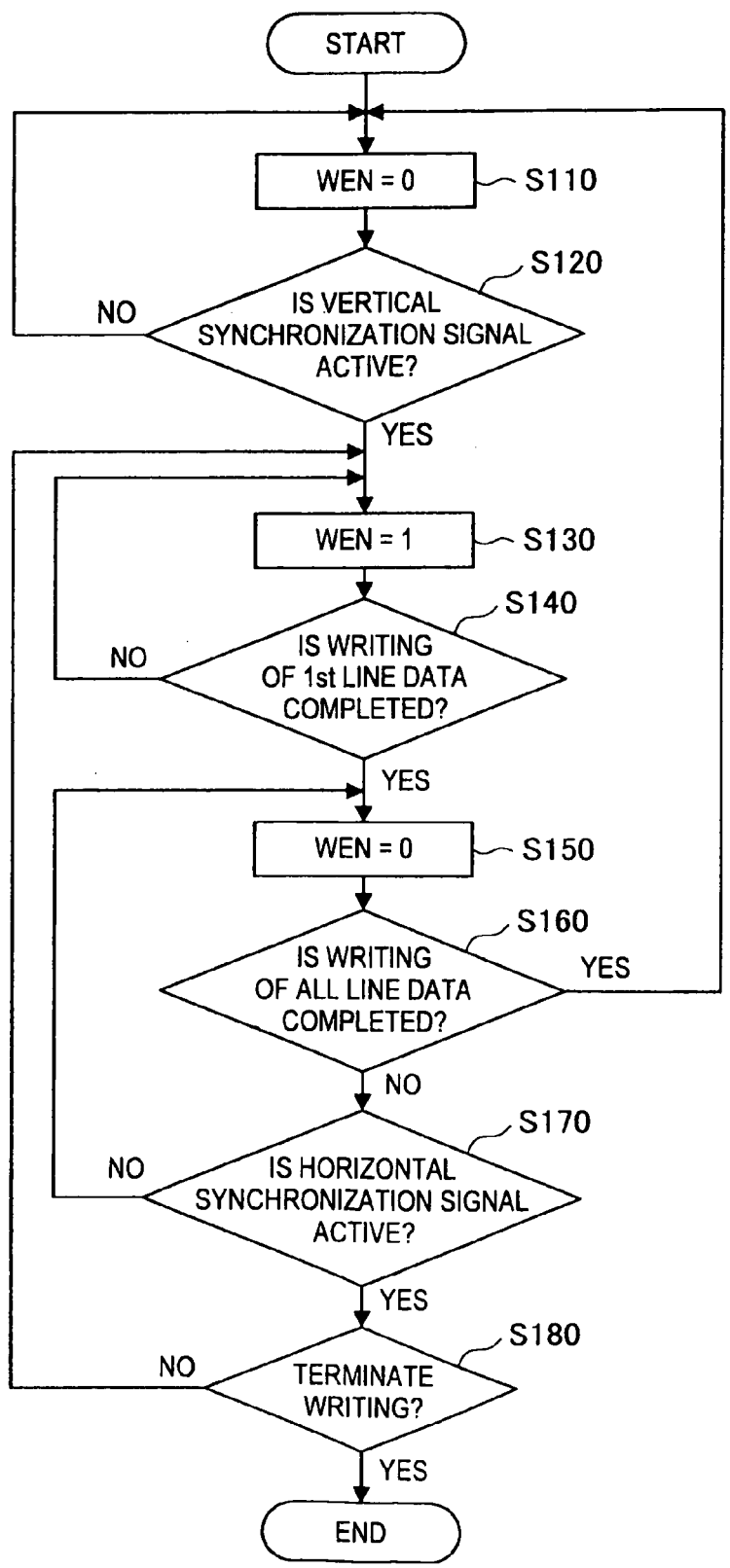
FIG. 7 is a flowchart showing a write processing of the image data by the data rate controller according to the embodiment.
Figure 8:
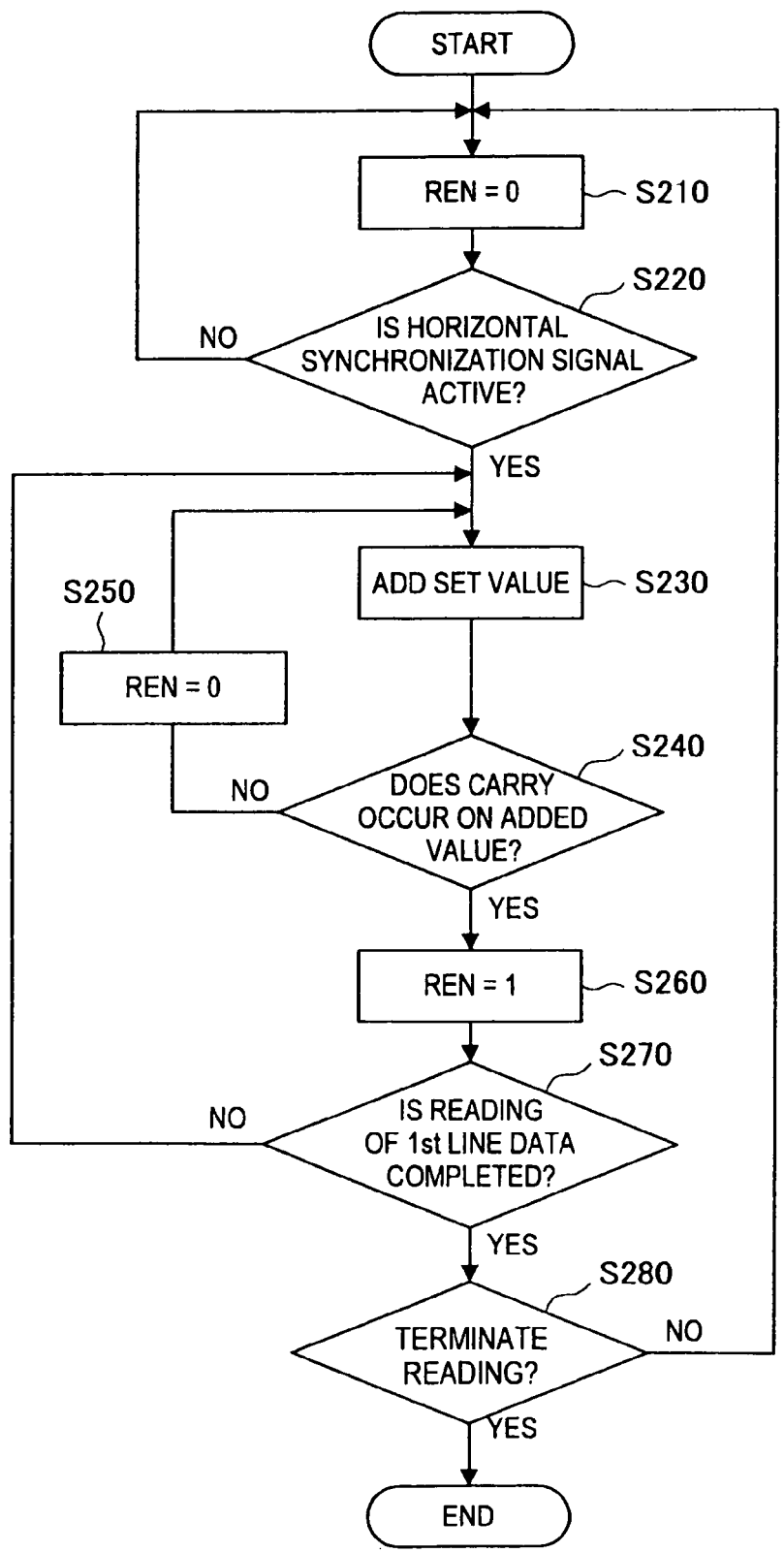
FIG. 8 is a flowchart showing a readout processing of the image data by the data rate controller according to the embodiment.
Figure 9:
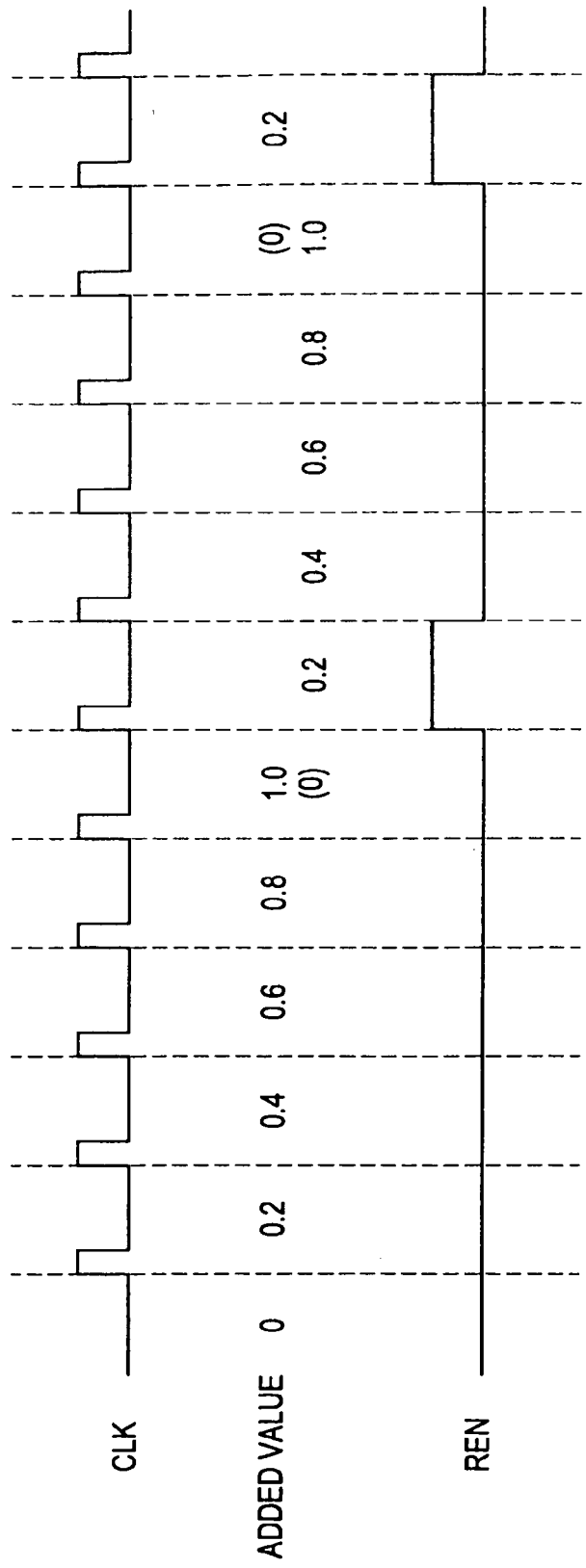
FIG. 9 is an explanatory diagram for explaining read timing of the image data.
Figure 10:
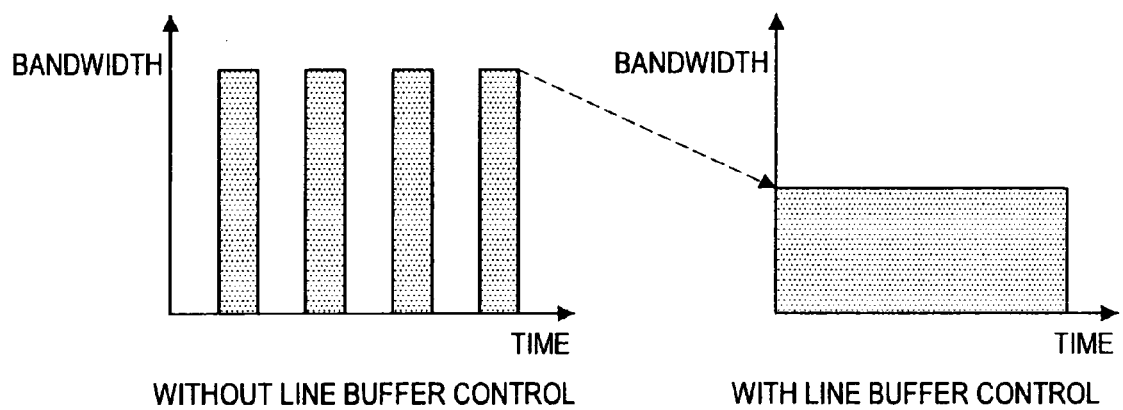
FIG. 10 is an explanatory diagram for explaining usages of data bus bandwidth.

The write processing and the readout processing of the image data will be described in detail in the following based on FIG. 7 to FIG. 10. In addition, FIG. 7 is a flowchart showing the write processing of the image data by the data rate controller 300 according to the present embodiment. FIG. 8 is a flowchart showing the readout processing of the image data by the data rate controller 300 according to the present embodiment. FIG. 9 is an explanatory diagram for explaining timing of reading out the image data. FIG. 10 is an explanatory diagram for explaining usage of data bus bandwidth.

<Write Processing of Image Data>

First, the write processing of the image data to the line buffer 310 will be described based on FIG. 7. In addition, in FIG. 7, the write enable signal is not output when an output flag WEN is 0 and the write enable signal is output when the output flag WEN is 1.

The output flag WEN is 0 at the beginning of the write processing of the image data to the line buffer 310 according to the present embodiment, as shown in FIG. 7 (step S110). First, whether the vertical synchronization signal is output is judged (step S120). The output flag WEN remains 0 until the vertical synchronization signal is output, and waits until the vertical synchronization signal is output. Then, the output flag WEN becomes 1 when the vertical synchronization signal is output (step S130). By this, the each line data of the image data is started to be written to the line buffer 310.

Next, it is judged whether the writing of the first line data (e.g. the R-Gr line 201 in FIG. 6) to the first buffer 312 of the line buffer 310 is completed (step S140). When it is judged at the step S140 that the writing of the first line data is not completed, the write processing is continued, returning to the step S130. On the other hand, when it is judged at the step S140 that the writing of the first line data is completed, the output flag is set to 0 (step S150).

Furthermore, whether all the line data of the image data is written to the line buffer 310 is judged (step S160). When it is judged at the step S160 that all the line data is written to the line buffer 310, the processing returns to the step S110 and waits until the vertical signal is output, i.e., until the image data is newly input. On the other hand, when it is judged at the step S160 that all the line data is not written to the line buffer 310, whether the horizontal synchronization signal is output is judged (step S170). When it is judged at the step S170 that the horizontal synchronization signal is not output, the processing returns to the step S150 and waits for writing the next line data to the line buffer 310 until the horizontal synchronization signal is output.

On the other hand, when it is judged at the step S170 that the horizontal synchronization signal is output, whether there is an instruction of terminating the write processing of the image data is judged (step S180). Then, when the write processing of the image data is continued, the processing returns to the step S130, and the output flag WEN is set to 1 and the second line data (e.g. Gr-B line 202 in FIG. 6) is written to the second buffer 314 of the line buffer 310. In this way, until the writing of all the line data of the image data is completed, the each line data of the image data is alternately written to the two buffers of the line buffer 310 at the output timing of the horizontal synchronization signal. In addition, when there is an instruction of terminating the write processing of the image data at the step S180, the write processing is terminated.

<Readout Processing of Image Data>

Next, the readout processing of the image data to the line buffer 310 will be described based on FIG. 8. In addition, the read enable signal is not output when the output flag REN is 0 and the read enable signal is output when the output flag REN is 1, in FIG. 8.

The output flag REN is 0 at the beginning of the readout processing of the image data into the line buffer 310 according to the present embodiment, as shown in FIG. 8 (step S210). First, whether the horizontal synchronization signal is output is judged (step S220). The output flag REN remains 0 until the horizontal synchronization signal is output, and waits until the horizontal synchronization signal is output. Then, the output flag REN becomes 1 when the horizontal synchronization signal is output. By this, the each line data of the image data is started to be read from the line buffer 310.

Next, when the horizontal synchronization signal is output, addition processing of the read frequency set values is performed (step S230). The output timing of the read enable signal is determined by the read frequency set value. At the step 230, the adder 340 reads out the read frequency set value from the set value storage 330 and performs addition processing of the read frequency set value per clock cycle. The adder 340 outputs the added value of the read frequency set values to the read enable generator 350.

Furthermore, the read enable generator 350 judges whether the added value of the read frequency set values input from the adder 340 is 1 or more (step S240). The read frequency set value is set to a value from 0 to 1 as described above. Accordingly, when the adder 340 repeats the addition of the read frequency set value, carry occurs on the added value and the added value becomes 1 or more at a certain timing. Whether carry occurs on the added value is judged at the step S240, and when carry does not occur, the output flag REN remains 0 (step S250), and the processing returns to the step S230 and the addition of the read frequency set value is repeated.

On the other hand, when it is judged that carry occurs on the added value at the step S240, the output flag REN is set to 1 (step S260). By this, the read enable generator 350 outputs the read enable signal to the line buffer 310. When receiving the input of the read enable signal, the line buffer 310 outputs to the image expanding circuit 360 the line data first written in one of the two buffers. Moreover, when the added value becomes 1 or more, the adder 340 makes a value of which 1 is subtracted from the added value a new added value.

Here, one example of the readout processing is shown in FIG. 9. The read frequency set value is set to 0.2 in this example. The adder 340 adds the read frequency set value at the output timing of each clock cycle (CLK). Then, when the added value becomes 1.0 and carry occurs, the output flag REN which directs an output of the read enable signal at the subsequent clock cycle becomes 1. By this, one line data is started to be output from the line buffer 310. Moreover, when carry occurs on the added value, the added value subtracted by (0 in the present example) is set to be a new added value, and at the subsequent clock cycle, the read frequency set value is added to the new added value. After that, when carry occurs again on the added value, the output flag REN again becomes 1 and the read enable signal is output.

Returning to FIG. 8, it is judged whether the first line data (e.g., R-Gr line 201 in FIG. 6) is subsequently read out from one of the buffers (e.g., the first buffer 312) of the line buffer 310 (step S270). When it is judged at the step S270 that the reading of the first line data is not completed, the readout processing returns to the step S230 and continues. At the step S230, the read frequency set value is added per clock cycle, and the line data is read out when the added value again becomes 1 or more.

On the other hand, when it is judged that the reading of the first line data is completed at the step S270, it is confirmed whether there is an instruction for terminating the readout processing (step S280). Then, when the write and readout processing of the image data is continued, the processing returns to the step S210, and the output flag REN is set to be 0 and waits the readout processing from the line buffer 310 until the subsequent horizontal signal is output. When the subsequent horizontal signal is output, the read frequency set value is started to be added, and the reading of the second line data (e.g., Gr-B line 202 in FIG. 6) is performed when the added value becomes or more. In addition, when there is an instruction for terminating the readout processing of the image data at the step S280, the readout processing is terminated.

The line buffer control by the data rate controller 300 according to the present embodiment has been described above. With the line buffer control by the data rate controller 300 according to the present embodiment, while the write processing of the line data is performed at high speed corresponding to the data rate of the image pickup device, the readout processing of the line data is performed at low speed according to the read frequency set value. That is, the reading of the line data is controllable by the read frequency set value without depending on the data rate of the image pickup device.

When the line buffer control according to the present embodiment is not performed, the data bus bandwidth instantaneously increases since the readout processing of the line data is also performed at high speed corresponding to the data rate of the image pickup device, as shown in the left graph in FIG. 10. On the contrary, by performing the line buffer control according to the present embodiment, the line data is read out from the line buffer 310 at low speed, thereby enabling reduction of the instantaneous usage of data bus bandwidth, as shown in the right graph in FIG. 10. By this, available data bus bandwidth can be used by other image processing blocks or a microcomputer, thereby enabling increase in processing efficiency. Moreover, the reduction of the instantaneous usage of the data bus bandwidth can reduce the peak value of power consumption within the camera system LSI 150 and can realize stable operation also from the aspect of power supply. Furthermore, since such buffer control can control data rate only by a read frequency set value being determined, it can be realized with a very simple circuit and implementation of software application.

<Setting of Read Frequency Set Value According to Imaging Mode>

Here, the read frequency set value which determines the speed of readout processing from the line buffer 310 can change its value according to imaging mode. In the digital steel camera 100, there are, for example, video recording mode, still image monitoring mode, and still image recording mode as imaging mode. The pixel count in one line output by the image pickup device and the horizontal period vary according to different imaging mode. Because of this, the reading rate (the output pixel count in one line divided by the horizontal period) of the image pickup device also varies according to imaging mode. In the present embodiment, the reading rate of the image pickup device can be determined within a range larger than the rate of writing the image data to the line buffer 310. This is because if the writing rate gets larger than the reading rate, the next line data is overwritten before the termination of the data readout due to the insufficient capacity for the readout.

For example, as shown in the following Table 1, a read frequency set value can be set for each imaging mode. In addition, the still image monitoring mode indicates a framing time before still image recording. In addition, readout rates of the image pickup device are calculated supposing that 1 pixel equals to 16 bit.

TABLE 1

| Readout mode | Pixel count in one line output by image pickup device (pixel) | Horizontal period (us) | Readout rate of image pickup device (Mega-pixel/sec/Mega-bit/sec) | Read frequency set value |
|---|---|---|---|---|
| Video recording | 1200 | 10 | 120/1920 | 0.20 |
| Still image monitoring | 1200 | 40 | 30/480 | 0.05 |
| Still image recording | 3600 | 15 | 240/3840 | 0.40 |

As shown in Table 1, when the readout rate of the one line output by the pickup device is large, the read frequency set value is set to be a relatively large value, as in the still image recording mode. When faster processing is necessary than in the still image monitoring mode, the read frequency set value is set to be a large value, as in the video recording mode. In this way, an appropriate read frequency set value is set according to imaging mode, and thereby only the necessary amount of the data bus bandwidth for the imaging mode can be used. Accordingly, the data bus bandwidth can be used more efficiently, and available data bus bandwidth can be efficiently utilized, for example, as used by other image processing blocks or a microcomputer.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the line buffer control in the digital steel camera is described in the above embodiment, but the present invention is not limited thereto. Such line buffer control can be applied to an imaging apparatus including an image pickup device capable of reading data at high speed, for example.

What is claimed is:

1. An information processing apparatus comprising:
a buffer for holding image data output line by line from an image pickup device;
a write enable generator for generating a write enable signal which indicates a timing by which the image data is written to the buffer line by line;
an adder for adding per reference clock a read frequency set value which determines readout frequency of the image data written in the buffer; and
a read enable generator for generating a read enable signal which indicates a timing by which the image data written in the buffer is read out line by line based on an added value of the read frequency set values,
wherein when the added value of the read frequency set values exceeds a predetermined value,
the read enable generator generates the read enable signal, and
the adder subtracts the predetermined value from the added value.

2. The information processing apparatus according to claim 1, further comprising:
a set value storage for storing the read frequency set value while correlating the read frequency set value with an imaging mode in which the image pickup device images the image; and
a changer for changing the read frequency set value according to the imaging mode.

3. The information processing apparatus according to claim 2, wherein the higher the read frequency of the image data is, the larger the read frequency set value is set.

4. The information processing apparatus according to claim 1, the read frequency set value is set such that a reading rate of reading out the image data from the buffer is larger than a writing rate of writing the image data to the buffer.

5. An information processing apparatus comprising:
a buffer for holding image data output line by line from an image pickup device;
a write enable generator for generating a write enable signal which indicates a timing by which the image data is written to the buffer line by line;
an adder for adding per reference clock a read frequency set value which determines readout frequency of the image data written in the buffer; and
a read enable generator for generating a read enable signal which indicates a timing by which the image data written in the buffer is read out line by line based on an added value of the read frequency set values,
wherein the write enable generator starts to output the write enable signal based on an output of a vertical synchronization signal which gets active at the head of a frame of the image data, and then outputs the write enable signal based on a horizontal synchronization signal which gets active at the head of each line of the image data.

6. A buffer control method, comprising the steps of:
generating a write enable signal which indicates a timing by which the image data output from an image pickup device line by line is written to a buffer;
writing the image data to the buffer line by line based on an output of the write enable signal;
adding per reference clock a read frequency set value which determines readout frequency of the image data written in the buffer;
generating a read enable signal which indicates a timing by which the image data written in the buffer is read out based on an added value of the read frequency set values; and
reading out the image data from the buffer line by line based on an output of the read enable signal,
wherein when the added value of the read frequency set values exceeds a predetermined value,
the read enable signal is generated, and
the predetermined value is subtracted from the added value.

7. A computer program for causing a computer to function as the means of:
generating a write enable signal which indicates a timing by which the image data output from an image pickup device line by line is written to a buffer;

writing the image data to the buffer line by line based on an output of the write enable signal;

adding a read frequency set value which determines read-out frequency of the image data written in the buffer per reference clock;

generating a read enable signal which indicates a timing by which the image data written in the buffer is read out based on an added value of the read frequency set values; and reading out the image data from the buffer line by line based on an output of the read enable signal, wherein when the added value of the read frequency set values exceeds a predetermined value, the read enable signal is generated, and the predetermined value is subtracted from the added value.

* * * * *